United States Patent
Willer

(10) Patent No.: US 6,393,109 B1
(45) Date of Patent: May 21, 2002

(54) APPARATUS AND METHOD OF COUPLING HOME NETWORK SIGNALS BETWEEN AN ANALOG PHONE LINE AND A DIGITAL UPN LINE

(75) Inventor: Bernd Willer, Moosburg (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/568,182

(22) Filed: May 9, 2000

(51) Int. Cl.[7] ............................................. H04M 11/00
(52) U.S. Cl. ................................ 379/90.01; 379/93.05; 379/93.06
(58) Field of Search ......................... 379/90.01, 93.01, 379/93.05, 93.06, 93.09, 156, 165, 196, 197, 198; 320/450, 458

(56) References Cited

U.S. PATENT DOCUMENTS

| 4,785,448 | A | | 11/1988 | Reichert et al. | |
|---|---|---|---|---|---|
| 4,918,688 | A | | 4/1990 | Krause et al. | |
| 5,841,841 | A | * | 11/1998 | Didds et al. | ............. 379/90.01 |
| 6,088,368 | A | * | 7/2000 | Rubinstain et al. | ......... 370/480 |

FOREIGN PATENT DOCUMENTS

| JP | 406276054 A | * | 9/1994 | .......... H03H/19/00 |
|---|---|---|---|---|
| WO | WO 98/54856 | | 3/1998 | |

OTHER PUBLICATIONS

Data Sheet, "Siemens ICs for Communications: Octal Transceiver for UPN Interfaces OCTAT–P, PEB 2096", Jan. 1996, pp. 1–62, Version 1.3 (T2096–V13–D2–7600), Munich Germany (author unknown).

Product Overview, "Siemens ICs for Communications: DSP Oriented PBX Controller DOC PEB 20560", Nov. 1997, pp. 1–34, Version 2.1, (DS1), Munich Germany (author unknown).

* cited by examiner

Primary Examiner—Sinh Tran
Assistant Examiner—Melur. Ramakrishnaiah
(74) Attorney, Agent, or Firm—Manelli Denison & Selter

(57) ABSTRACT

A customer premises system having two-wire buses for transmission of digital telephony signals between digital terminal ends of a private branch exchange (PBX) and respective digital end equipment units includes low pass filters coupled to terminal ends of the two-wire buses serving the digital equipment, for isolation of a home PNA signal from the digital end equipment units and the digital terminal ends of the PBX, and a first high pass filter configured for cross coupling the home PNA signal across the two-wire buses. A second high pass filter is used for cross coupling home PNA signals across two-wire (e.g., tip and ring) buses used to connect analog end equipment to analog terminal ends of the PBX. A third high pass filter, matched with the first and second high pass filters, is used for cross coupling the home PNA signals between the first high pass filter and the second high pass filter, enabling a home network to be implemented independent of whether the network node is coupled to a two-wire bus coupled to the analog portion of the PBX or the digital portion of the PBX.

14 Claims, 3 Drawing Sheets

APPARATUS AND METHOD OF COUPLING HOME NETWORK SIGNALS BETWEEN AN ANALOG PHONE LINE AND A DIGITAL UPN LINE

BACKGROUND OF THE INVENTION

1. Field of the Invention

The present invention relates to network interfacing, and more particularly to methods and systems for controlling transmission of data between network stations connected to a telephone line medium.

2. Background Art

Local area networks use a network cable or other media to link stations on the network. Each local area network architecture uses a media access control (MAC) enabling network interface cards at each station to share access to the media.

Conventional local area network architectures use a media access controller operating according to half-duplex or full duplex Ethernet (ANSI/IEEE standard 802.3) protocol using a prescribed network medium, such as 10BaseT. Newer operating systems require that a network station be able to detect the presence of the network. In an Ethernet 10BaseT environment, the network is detected by the transmission of a link pulse by the physical layer (PHY) transceiver. The periodic link pulse on the 10BaseT media is detected by a PHY receiver, which determines the presence of another network station transmitting on the network medium based on detection of the periodic link pulses. Hence, a PHY transceiver at station A is able to detect the presence of station B, without the transmission or reception of data packets, by the reception of link pulses on the 10BaseT medium from the PHY transmitter at station B.

Efforts are underway to develop an architecture that enables computers to be linked together using conventional twisted pair telephone lines instead of established local area network media such as 10BaseT. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air-conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak to peak voltage on the order of 10 to 20 millivolts, whereas network signals from another network station may have a value on the order of one to two volts. Hence, the amplitude and shape of a received pulse may be so distorted that recovery of a transmitted clock or transmit data from the received pulse becomes substantially difficult.

An additional problem encountered in European telephone systems involves the use of a network termination basic access (NTBA) device, used as an interface between the residential customer premises and a central office of the public switched telephone network for transmission of Integrated Services Digital Network (ISDN)-based signals. In particular, NTBA devices map a two wire ISDN signal from a central office into a four wire S0 bus having a two wire send path and a two wire receive path for sending and receiving the ISDN-based signals throughout a customer premises.

Another transmission scheme is the use of 2-wire UPN lines as an alternative to analog POTS lines or the S0 bus lines. UPN is a digital transmission scheme used in modern PBX systems and having the advantage of enabling intelligent digital phones to be connected to a PBX via two wires instead of the four wire S0 bus. In particular, the UPN protocol has a data rate of 384 kbps, and a 38 -bit frame structure that uses AMI coding for data transmission.

Numerous problems are encountered if one attempts to supply home PNA network signals in a customer premises having two-wire UPN lines for digital telephony. In particular, the PBX systems using two wire UPN lines connect the end equipment (e.g., the digital telephones) in a star configuration. Consequently, home PNA signals transmitted from one end equipment to another end equipment would suffer substantial signal loss during transmission through the PBX, especially since the PBX is not configured for passing home PNA signals. In addition, the 384 kbps UPN signal has a number of harmonics above the 384 kHz base signal that may interfere with the home PNA signals. Further, the home PNA signal, transmitted for example at a frequency of 7.5 MHz, may interfere with the PBX equipment or the end equipment, adversely affecting reliable transmission and reception of the UPN digital signals. Capacitive influences on the two wire UPN lines also may adversely affect the home PNA signals, limiting the effective transmission distance between two network stations.

The inability of PBX systems to carry home PNA signals also results in the disadvantage that any home network is limited based on the telephony equipment in use. In particular, the PBX system prevents transfer of home PNA signals between a user of a UPN type digital telephone and a user of a conventional analog telephone, even though the UPN type digital telephone and the conventional analog telephone may be coupled to a respective digital line card and an analog line card within the same PBX.

SUMMARY OF THE INVENTION

There is need for an arrangement for interconnecting computer end stations in a home telephone network having a private branch exchange (PBX) and configured for sending digital UPN-based signals on digital lines using digital line cards and analog telephony signals on analog lines using analog line cards, regardless of whether the computer end stations are coupled to the digital lines or the analog lines.

There is also a need for arrangement for transmitting home PNA signals of a home telephone network, in a customer premises having a private branch exchange (PBX) and configured for sending telephony signals to UPN-based end equipment and analog end equipment, in a manner that optimizes transmission of the home PNA signal between the UPN-based end equipment and the analog end equipment.

These and other needs are attained by the present invention, where a customer premises system having two-wire buses for transmission of telephony signals between a private branch exchange and respective end equipment units includes low pass filters coupled to digital PBX portions and digital end equipment unit terminal ends of the two-wire buses, for isolation of a home PNA signal from the digital end equipment units and the digital PBX portions, and high pass filters configured for cross coupling the home PNA signal across the two-wire buses serving the digital end equipment and across two-wire buses serving analog telephony equipment.

One aspect of the present invention provides a method of implementing a local area network in a customer premises telephone network. The customer premises telephone network has a plurality of digital and analog end equipment units having respective end equipment unit terminal ends, a private branch exchange (PBX) having digital PBX terminal ends and analog PBX terminal ends, and a plurality of two-wire buses. The two-wire buses are configured for connecting the digital and analog end equipment unit terminal ends to the digital PBX terminal ends and the analog PBX terminal ends for transmission of UPN protocol digital signals and analog telephony signals, respectively. The method includes connecting low pass filters, each configured for passing the UPN protocol digital signals and rejecting a local area network signal, at each digital PBX terminal end and each digital end equipment terminal end of a corresponding two-wire bus, each two-wire bus connected to a corresponding digital PBX terminal end having a first node between the corresponding two connected low pass filters. The method also includes connecting a first high pass filter, configured for passing the local area network signal and rejecting the UPN protocol digital signals, across the corresponding first node of each of the two-wire busses connected to the corresponding digital PBX terminal end. A second high pass filter, configured for passing the local area network signal and rejecting the analog telephony signals, is connected between the first high pass filter and another two-wire bus connected to one of the analog PBX terminal ends. The local area network signal is then transmitted from a first network node on one of the two-wire buses coupled to the digital PBX terminal end at the corresponding first node to a second network node coupled to another two-wire bus connected to one of the analog PBX terminal ends.

Connection of the low pass filters at each digital PBX terminal end and each digital end equipment terminal end ensures that UPN protocol digital signals can be transmitted and received without interference from the local area network signal. In addition, the low pass filters limit the UPN protocol digital signals, providing a distortion-free transmission medium for the higher frequency local area network signal. Moreover, connecting the high pass filters across the two-wire buses enables the local area network signal to bypass the PBX, regardless of whether the network node is coupled to a two-wire bus serving a digital end equipment unit or analog end equipment unit, without introducing crossover of the telephony signals. Finally, the low pass filters and the high pass filter can be configured to minimize the capacitive influence, induced by the PBX 16 and the UPN end equipment units 14, encountered by the local area network signal on the two-wire buses, improving transmission performance and enabling the network length between two network nodes to be substantially increased.

Another aspect of the present invention provides a computer network. The computer network includes a private branch exchange (PBX) having digital PBX terminal ends configured for sending and receiving UPN protocol digital telephony signals and analog PBX terminal ends configured for sending and receiving analog telephony signals, digital end equipment units configured for sending and receiving the UPN protocol digital telephony signals, analog end equipment units configured for sending and receiving the analog telephony signals, and a plurality of two-wire buses configured for connecting the digital end equipment units and the analog end equipment units to the digital PBX terminal ends and the analog PBX terminal ends, respectively. Low pass filters, configured for passing the UPN protocol digital telephony signals and rejecting computer network signals, are coupled at each end of the two-wire buses connecting the digital end equipment units and the digital PBX terminal ends. High pass filters interconnect the two-wire buses for passing the computer network signals between network nodes connected to any one of the two-wire buses.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
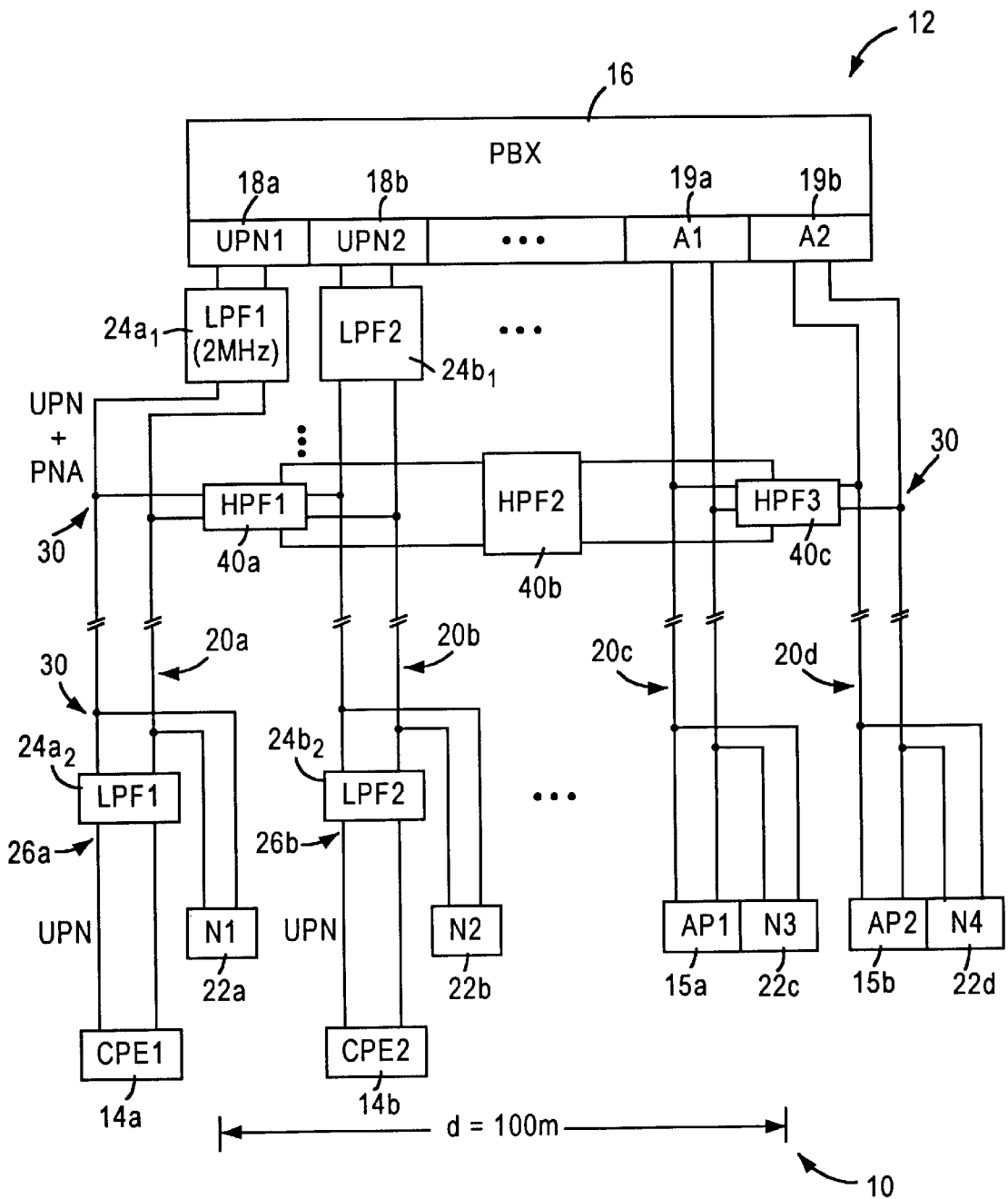
FIG. 1 is a block diagram illustrating a computer network implemented in a customer premises having UPN-based wiring and POTS-based wiring according to an embodiment of the present invention.

FIG. 1 is a block diagram illustrating an Ethernet (IEEE 802.3) local area computer network 10 implemented in a customer premises telephone network 12 using UPN-based digital signals and analog telephony signals according to an embodiment of the present invention. As shown in FIG. 1, the customer premises telephone network 12 includes a plurality of digital end equipment units 14, also referred to as customer premises equipment (CPE), analog end equipment units 15 (e.g., analog phones (AP)), a private branch exchange (PBX) 16 having UPN protocol-compliant digital PBX terminal ends 18 for sending and receiving UPN protocol digital telephony signals, analog PBX terminal ends 19 for sending and receiving analog (e.g., POTS type) telephony signals, and two-wire buses 20 configured for connecting the digital PBX terminal ends 18 and the analog PBX terminal ends 19 to the digital end equipment units 14 and the analog end equipment units 15, respectively.

The local area computer network includes network nodes 22, for example computer workstations, configured for sending and receiving IEEE 802.3 type data packets according to the home PNA protocol specified by the Home Phone Network Alliance.

Conventional attempts to transmit home PNA type signals between the network nodes 22 via the customer premises telephone network 12 would be unsuccessful, since the PBX 16 is not configured for transmitting the 7.5 MHz home PNA signal. In addition, the digital UPN protocol signals transmitted at 384 kbps generate harmonics above 384 kHz baseband frequency, resulting in interference with the home PNA signal.

Figure 2:
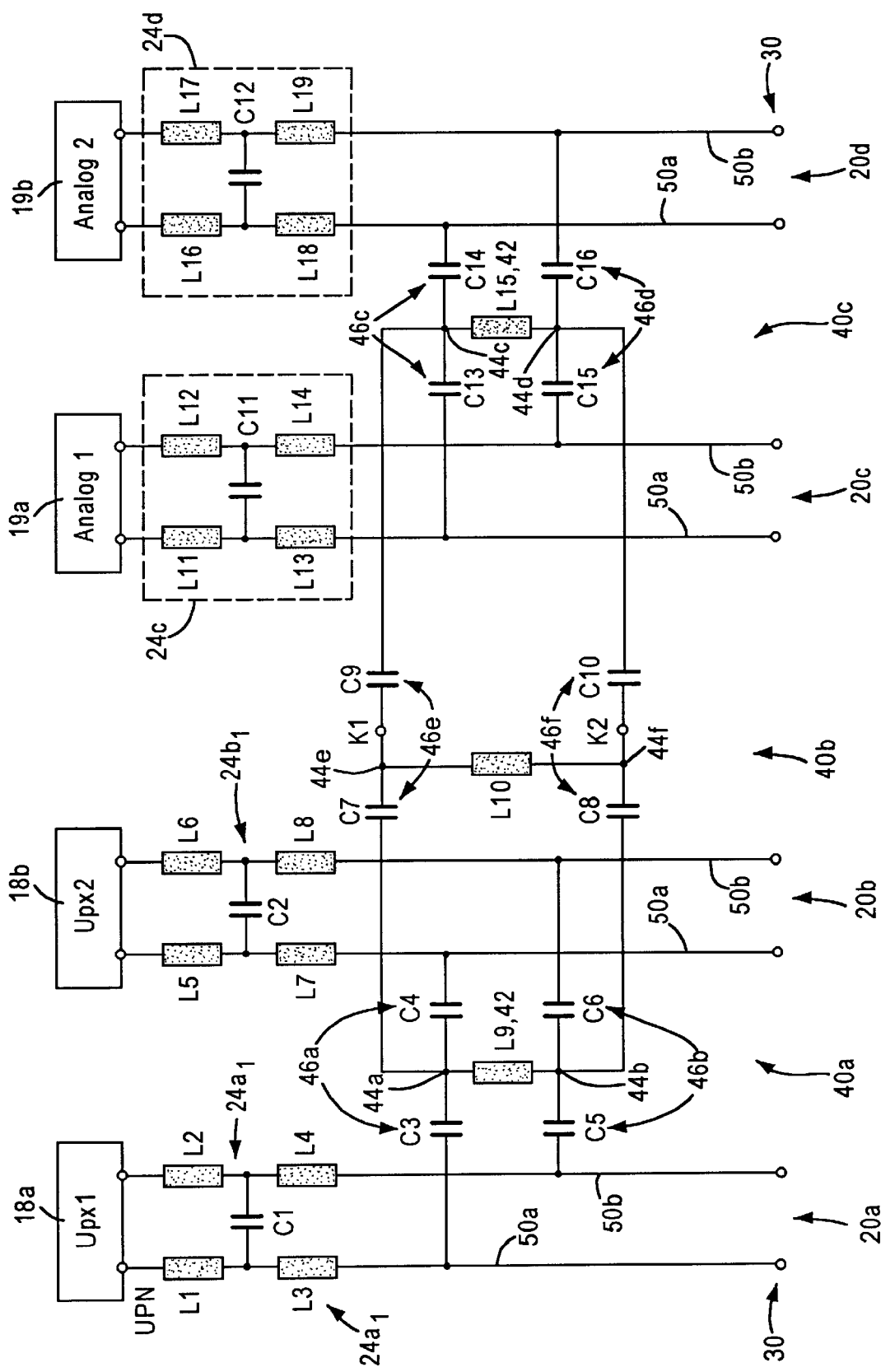
FIG. 2 is a diagram illustrating in detail the low pass filters and the high pass filters coupled at the digital PBX terminal ends and the analog PBX terminal ends of FIG. 1.
Figure 3:
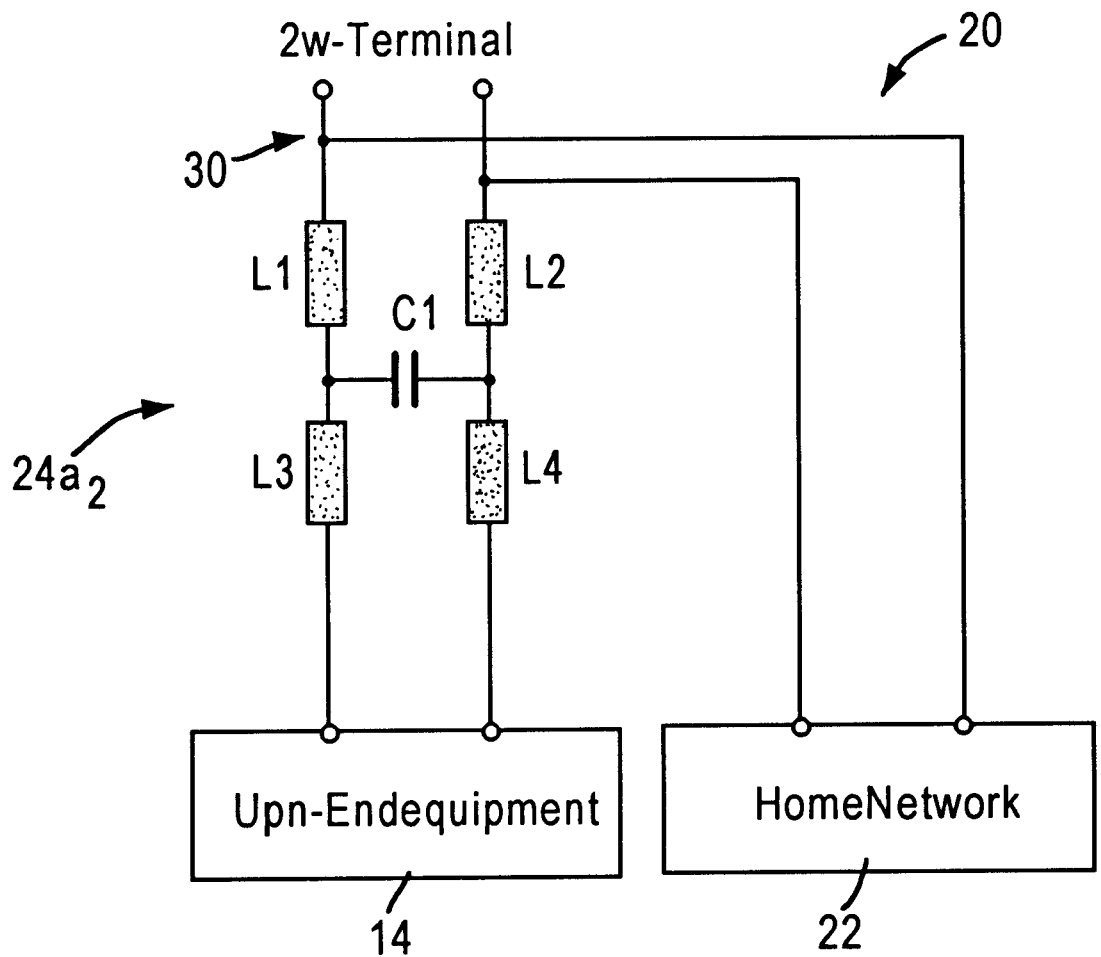
FIG. 3 is a diagram illustrating the low pass filter and the coupling node on a two wire UPN bus for the end equipment unit and the network node, respectively.

According to the disclosed embodiment, low pass filters 24 are connected at each PBX terminal end 18 and each end equipment terminal end 26 of each two wire bus 20 to band limit the UPN protocol digital signals and reject the home PNA network signals. In particular, each low pass filter 24, illustrated in further detail in FIGS. 2 and 3, is configured to have a −3dB cutoff frequency of about 2 MHz, with an attenuation of about −13 dB/octave. Hence, the 2 MHz cutoff frequency for the low pass filters 24 enables substantially all of the information in the 384 kbps UPN protocol digital signals to be passed, while band limiting the UPN protocol digital signals to avoid unnecessary signal distortion within the shared transmission region, defined by a connection node 30 positioned between the low pass filter (e.g., $24a_1$) coupled to the digital PBX terminal end (e.g., 18a), and the low pass filter (e.g., $24a_2$) coupled to the digital end equipment unit terminal end (e.g., 26a).

In addition, the 2 MHz cutoff frequency for the low pass filters 24 ensures that the 7.5 MHz home PNA signals do not interfere with the PBX 16 or the digital telephony end equipment units 14. Hence, the low pass filters 24 enable the digital end equipment units 14 to send and receive UPN protocol digital signals via the PBX 16, without interference by home PNA signals transmitted on the two wire buses 20 via the connecting nodes 30.

The computer network 10 also includes a high pass filters 40 configured for passing the computer network home PNA signals across the two wire buses 20 at the respective connection nodes 30, bypassing the PBX 16. In particular, the high pass filters 40, illustrated in detail in FIG. 2, have a −3dB cutoff frequency of at least about 2 MHz for passing the home PNA network signal and rejecting the UPN protocol digital signals and analog POTS signals. For example, FIG. 2 illustrates that the high pass filter 40a has an inductor 42 (L9) having a first inductor terminal end 44a and a second inductor terminal end 44b, also referred to as filter nodes. The high pass filter 40a also includes, for each two wire bus 20, first and second connecting capacitors 46a and 46b configured for connecting first and second wires 50a and 50b to the first and second inductor terminal ends 44a and 44b, respectively. For example, the capacitor 46a (C3) connects the first wire 50a of the two-wire bus 20a to the first inductor terminal end 44a, whereas the capacitor 46a (C4) connects the first wire 50a of the two-wire bus 20b to the first inductor terminal end 44a. Similarly, the capacitor 46b (C5) connects the second wire 50b of the two-wire bus 20a to the second inductor terminal end 44b, whereas the capacitor 46b (C6) connects the second wire 50b of the two-wire bus 20b to the second inductor terminal end 44b.

The high pass filter 40c has a structure similar to the high pass filter 40a, where the capacitors 46c (C13 and C14) connect the first wires 50a of the two-wire buses 20c and 20d to the first inductor terminal end 44c, respectively. The capacitors 46d (C15 and C16) connect the second wires 50b of the two-wire buses 20c and 20d to the second inductor terminal end 44d, respectively. In addition, the capacitors 46c and 46d plus the corresponding inductor 42 (L15) are selected to insure that the impedance encountered by the two wire bus lines 20c and 20d match the input impedance of the analog terminal ends 19 to minimize capacitance and reflections. If necessary, optional low pass filters 24c and 24d may be added to the analog terminal ends 19 to reduce front end capacitance that may otherwise be encountered by the home PNA signals.

The number of two wire buses 20 to be connected to the high pass filters 40a or 40c via a corresponding set of connecting capacitors 46a, 46b, 46c and 46d depends on the time constant (τ) and impedances of the filter elements versus the home PNA signal frequency.

The high pass filter 40b has capacitors 46e (C7 and C9) configured for connecting the respective first inductor terminal ends 44a and 44c to the first inductor terminal end 44e of the inductor (L10). Similarly, the capacitors 46f (C8 and C10) are configured for connecting the respective second terminal ends 44b and 44d to the second inductor terminal end 44f of the inductor (L10). The capacitors C7, C8, C9, and C10 and the inductor L10 are selected to match the impedance induced by the high pass filters 40a coupled to the two wire buses serving the digital telephony equipment. Hence, the high pass filter 40b cross couples the home network signals for transmission across the two wire buses serving the digital telephony equipment and the analog telephony equipment while minimizing adverse effects to the transmission line impedance that may be encountered by the home PNA signals during propagation between the network nodes 22a–22d.

FIG. 3 illustrates the end equipment unit 14 and the home network node 22 connected to the two wire bus 20. In particular, the end equipment 14 is connected to the two wire bus 20 via the low pass filter 24, ensuring that the UPN protocol digital telephony signal is band limited to 2 MHz, and that the 7.5 MHz home PNA signal does not reach the end equipment 14. As shown in FIG. 3, the network node 22 is directly coupled to the connection node 30 for transmission of the home PNA network signals between the low pass filters 24. Hence, the band limited UPN signal on the connection node 30 does not adversely affect the network node 22. In cases of high noise such as EMI from the computer having the home PNA card 22, a high pass filter may be used to minimize the noise encountered at the node 30.

While this invention has been described with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of implementing a local area network in a customer premises telephone network having a plurality of digital and analog end equipment units having respective end equipment unit terminal ends, a private branch exchange (PBX) having digital PBX terminal ends and analog PBX terminal ends, and a plurality of two-wire buses configured for connecting the digital and analog end equipment unit terminal ends to the digital PBX terminal ends and the analog PBX terminal ends for transmission of UPN protocol digital signals and analog telephony signals, the method comprising:

connecting low pass filters, each configured for passing the UPN protocol digital signals and rejecting a local area network signal, at each digital PBX terminal end and each digital end equipment terminal end of a corresponding two-wire bus, each two-wire bus that is connected to a corresponding digital PBX terminal end having a first node between the corresponding two connected low pass filters;

connecting a first high pass filter, configured for passing the local area network signal and rejecting the UPN protocol digital signals, across the corresponding first node of each of the two-wire buses connected to the corresponding digital PBX terminal end;

connecting a second high pass filter, configured for passing the local area network signal and rejecting the analog telephony signals, between the first high pass filter and at least one of the two-wire buses connected to one of the analog PBX terminal ends; and transmitting the local area network signal from a first network node on one of the two-wire buses coupled to the digital PBX terminal end at the corresponding first node to a second network node coupled to another of the two-wire buses connected to one of the analog PBX terminal ends.

2. The method of claim 1, wherein the step of connecting a low pass filter includes setting a −3dB cutoff frequency of each low pass filter to a frequency of up to about 2 MHz.

3. The method of claim 2, wherein the steps of connecting the first and second high pass filters each include setting a −3dB cutoff frequency of the first and second high pass filter to a frequency of at least about 2 MHz for passing the local area network signal and rejecting the UPN protocol digital signals.

4. The method of claim 3, wherein the transmitting step includes transmitting the local area network signal from the first network node to the second network node across a distance of about 100 meters.

5. The method of claim 1, further comprising connecting another first high pass filter between two two-wire buses connected to respective analog PBX terminal ends.

6. The method of claim 5, wherein the step of connecting the first high pass filter includes:

first coupling first ends of first and second connecting capacitors to respective first and second wires of a corresponding two wire bus serving a corresponding digital PBX terminal end;

second coupling second ends of the first and second capacitors to respective terminal ends of an inductor to form first and second filter nodes, respectively;

repeating the first and second coupling steps for each corresponding two wire bus serving a corresponding digital PBX terminal end.

7. The method of claim 6, wherein the step of connecting the second high pass filter includes:

connecting a first end of the second high pass filter to the respective terminal ends of the first and second filter nodes; and connecting a second end of the high pass filter to respective ends of an inductor in the another first high pass filter.

8. The method of claim 6, wherein the step of connecting the low pass filters and the steps of connecting the first and second high pass filter each compris configuring the corresponding filter for minimizing a capacitive influence, induced by the PBX and the end equipment units, encountered by the local area network signal on the corresponding two-wire bus.

9. A computer network comprising:

a private branch exchange (PBX) having digital PBX terminal ends configured for sending and receiving UPN protocol digital telephony signals and analog PBX terminal configured for sending and receiving analog telephony signals;

digital end equipment units configured for sending and receiving the UPN protocol digital telephony signals;

analog end equipment units configured for sending and receiving the analog telephony signals;

a plurality of two-wire buses configured for connecting the digital end equipment units and the analog end equipment units to the digital PBX terminal ends and the analog PBX terminal ends, respectively;

low pass filters, configured for passing the UPN protocol digital telephony signals and rejecting computer network signals, coupled at each end of the two-wire buses connecting the digital end equipment units and the digital PBX terminal ends; and high pass filters configured for interconnecting the two-wire buses for passing the computer network signals between network nodes connected to any one of the two-wire buses.

10. The computer network of claim 9, wherein each of the low pass filters and the high pass filters are configured for minimizing a capacitive influence, induced by the PBX and the end equipment units, encountered by the local area network signal on the corresponding two-wire bus.

11. The computer network of claim 10, wherein the two-wire buses are configured with the PBX to provide a maximum distance between any of the network nodes of up to about 100 meters.

12. The computer network of claim 9, wherein each low pass filter is symmetrically configured for a −3dB cutoff frequency of up to about 2 MHz.

13. The computer network of claim 12, wherein the high pass filters are symmetrically configured for a −3dB cutoff frequency of at least about 2 MHz for rejecting the UPN protocol digital telephony signals.

14. The computer network of claim 9, wherein the high pass filters include:

a first set of high pass filters having (1) a first inductor having first and second inductor terminal ends, (2) first and second connecting capacitors for each two wire bus serving a corresponding digital PBX terminal end, the first and second connecting capacitors configured for connecting first and second wires of the corresponding two wire bus to the first and second inductor terminal ends, respectively;

a second set of high pass filters having (1) a second inductor having third and fourth inductor terminal ends, (2) third and fourth connecting capacitors for each two wire bus serving a corresponding analog PBX terminal end, the third and fourth connecting capacitors configured for connecting first and second wires of the corresponding two wire bus to the third and fourth inductor terminal ends, respectively; and a third high pass filter having first filter terminal ends connected to the first and second inductor terminal ends, and second filter terminal ends connected to the third and fourth inductor terminal ends.

* * * * *

UNITED STATES PATENT AND TRADEMARK OFFICE
CERTIFICATE OF CORRECTION

PATENT NO. : 6,393,109 B1
DATED : May 21, 2002
INVENTOR(S) : Willer

It is certified that error appears in the above-identified patent and that said Letters Patent is hereby corrected as shown below:

Column 8,
Line 1, insert -- ends -- after "PBX terminal"

Signed and Sealed this

Ninth Day of July, 2002

Attest:

Attesting Officer

JAMES E. ROGAN
Director of the United States Patent and Trademark Office